(12) United States Patent
Sampson

(10) Patent No.: US 10,380,368 B1
(45) Date of Patent: *Aug. 13, 2019

(54) DATA FIELD MASKING AND LOGGING SYSTEM AND METHOD

(71) Applicant: State Farm Mutual Automobile Insurance Company, Bloomington, IL (US)

(72) Inventor: Kirk W. Sampson, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,263

(22) Filed: Jun. 5, 2018

Related U.S. Application Data

(63) Continuation of application No. 14/844,357, filed on Sep. 3, 2015, now Pat. No. 10,049,227.

(60) Provisional application No. 62/139,529, filed on Mar. 27, 2015.

(51) Int. Cl.
| | |
|---|---|
| *G06F 7/04* | (2006.01) |
| *G06F 17/30* | (2006.01) |
| *H04N 7/16* | (2011.01) |
| *G06F 21/62* | (2013.01) |
| *G06F 21/60* | (2013.01) |

(52) U.S. Cl.
CPC ........ *G06F 21/6218* (2013.01); *G06F 21/606* (2013.01)

(58) Field of Classification Search
CPC ............. G06F 21/6254; G06F 21/6245; G06F 21/6218; G06F 21/606
See application file for complete search history.

(56) References Cited

U.S. PATENT DOCUMENTS

| | | | |
|---|---|---|---|
| 7,953,671 | B2 | 5/2011 | Bishop et al. |
| 8,312,064 | B1* | 11/2012 | Gauvin ............... G06F 21/6218 707/822 |
| 8,462,949 | B2 | 6/2013 | Anderson et al. |
| 8,678,275 | B1 | 3/2014 | Bowen et al. |
| 2010/0124363 | A1 | 5/2010 | Ek et al. |

(Continued)

OTHER PUBLICATIONS

Nov. 25, 2014; IBM InfoSphere Guardium Applications helps you easily construct masking rules.

(Continued)

*Primary Examiner* — Trong H Nguyen

(57) ABSTRACT

A computer-implemented method for controlling the expression of a block of data from a sensitive data storage device, the method including the steps of receiving from a software application a request to transfer the block of data from the source sensitive data storage device for expression at a destination device, determining a data mask indicator for the block of data, applying a limited expression format based upon the data mask indicator, and expressing the block of data at the destination device in the limited expression format, such as to facilitate protecting or masking sensitive data. The method may further include allowing a user to request revelation of a masked portion of the block of data, recording in a memory log user activity relating to such revelation request(s) of the user, and providing regular reports and/or administrative alerts relating to such logged user activity.

20 Claims, 4 Drawing Sheets

(56) References Cited

U.S. PATENT DOCUMENTS

| | | |
|---|---|---|
| 2012/0259877 A1 | 10/2012 | Raghunathan |
| 2013/0144901 A1* | 6/2013 | Ho .................. G06F 16/248 707/769 |
| 2013/0198522 A1* | 8/2013 | Kohno .................. G06F 21/62 713/182 |
| 2013/0321452 A1 | 12/2013 | Kawalkar |
| 2014/0047556 A1 | 2/2014 | Davis |
| 2014/0123303 A1 | 5/2014 | Shukla |
| 2014/0173450 A1* | 6/2014 | Akula .................. G06F 21/6245 715/741 |
| 2014/0366158 A1 | 12/2014 | Han |
| 2015/0058622 A1 | 2/2015 | Sturgill |

OTHER PUBLICATIONS

Nov. 2014; Release Notes—IBM InfoSphere Guardium for Applications V10.0.
2017; IBM Security Guardium Data Protection for Databases.
2017; Data security and protection; Overview.
2017; Data security and protection; Products.
Sep. 28, 2010; Guardium Database Monitoring & Protection.
IBM; Concepts for Guardium for Applications.
IBM; IBM Guardium.
IBM; Discover Sensitive Data.

* cited by examiner

| Name | Customer Name | SSN | Shutter | view |

Driver's License | Partial Shutter|64L 785 | view

FIG. 4

DATA FIELD MASKING AND LOGGING SYSTEM AND METHOD

RELATED APPLICATIONS

The current patent application is a continuation of, and claims the benefit of, U.S. patent application Ser. No. 14/844,357, entitled "DATA FIELD MASKING AND LOGGING SYSTEM AND METHOD" and filed Sep. 3, 2015, which claims priority benefit with regard to all common subject matter to U.S. Provisional Application Ser. No. 62/139,529, entitled "DATA FIELD MASKING AND LOGGING SYSTEM AND METHOD," and filed Mar. 27, 2015. The listed earlier-filed applications are hereby incorporated by reference in their entireties into the current patent application.

FIELD OF THE INVENTION

The present disclosure generally relates to a system and method for controlling and tracking the expression of information from a protected storage environment and, more particularly to a system and method for masking and logging activity relating to data fields.

BACKGROUND

Recent years have seen significant steps toward tightening and restricting access to data held by organizations that relates to individuals and consumers, for example personally-identifiable and/or medical information. For instance, state and federal laws increasingly require businesses to implement heightened data security protocols and to provide more frequent notices to individuals when actual or potential security breaches occur. These obligations have become onerous for businesses, and data management costs are a burgeoning concern for IT professionals and executives.

The regulatory steps outlined above arise, at least in part, in response to an increased threat from individuals who seek to steal and misuse personal data. As more personal data is stored by private and governmental organizations with each passing year, criminals become increasingly adept at illegally retrieving and exploiting such information, and at concealing evidence of their crimes. Resulting data management risks reach beyond external "hacking" threats to secure data storage environments. The risks include internal organizational threats posed by employee(s) or others that are regularly granted limited access to secure data, but that may have a concealed motive to exceed such access for personal gain.

Conventional methods for protecting data in a secure storage environment are inadequate for minimizing modern data management risks and associated costs. For example, conventional permission-based access protocols for protecting secure data may fail to provide precise and controlled data flow and presentation of data, leading to increased organizational costs in connection with data breach mitigation and notification efforts. There is therefore a need for an improved system and method for controlling the expression of protected information.

BRIEF SUMMARY

Embodiments of the present technology relate to computer-implemented methods, network computing devices, and computer-readable media for controlling the expression of data from a sensitive data storage device. "Expression" of data refers to making the data or a representation or version thereof available at the destination device and/or to the user. Certain embodiments provide for receiving from a software application a request to transfer a block of data from the source sensitive data storage device for expression at a destination device, determining a data mask indicator for the block of data, applying a limited expression format based on the data mask indicator, and/or expressing the block of data at the destination device in the limited expression format. Certain embodiments may further include allowing a user to request revelation of a masked portion of the block of data, recording in a memory log user activity relating to such revelation request(s) of the user, and/or providing regular reports and/or administrative alerts relating to such logged user activity.

One aspect of the technology may provide a computer-implemented method for controlling the expression of data from a sensitive data storage device. The computer-implemented method may include (1) receiving, via one or more processors, from a software application a request to transfer a block of data from a source sensitive data storage device for expression at a destination device. The method may further include (2) determining, via the one or more processors, a data mask indicator for the block of data, (3) applying, via the one or more processors, a limited expression format based upon the data mask indicator, and/or (4) expressing, such as under the direction or control of the one or more processors, the block of data at the destination device in the limited expression format to facilitate protecting sensitive data. The method may include additional, fewer, or alternative actions, including those discussed elsewhere herein.

Another aspect of the technology may provide a computer-readable media for controlling the expression of data from a sensitive data storage device. The computer-readable media may include executable code stored thereon, wherein the code instructs a processing element to perform the step of receiving from a software application a request to transfer a block of data from a source sensitive data storage device for expression at a destination device. The code may further instruct the processing element to perform the steps of determining a data mask indicator for the block of data, applying a limited expression format based upon the data mask indicator, and/or expressing the block of data at the destination device in the limited expression format to facilitate protecting sensitive data. The code stored on the computer-readable media may instruct the processing element to perform additional, fewer, or alternative actions, including those discussed elsewhere herein.

Yet another aspect of the technology may provide a network computing device for controlling the expression of data from a sensitive data storage device. The network computing device may include a communication element, a memory element, and/or a processing element. The communication element may receive and transmit communications to and from a plurality of data storage devices and a plurality of data transmission devices. The memory element may be electronically coupled to the communication element and may store executable instructions. The processing element may be electronically coupled to the communication element and the memory element. The processing element may be configured to receive from a software application a request to transfer a block of data from a source sensitive data storage device for expression at a destination device. The processing element may further be configured to determine a data mask indicator for the block of data, apply a limited expression format based upon the data mask indicator, and/or express the block of data at the destination device in the limited expression format. The network computing device may include additional, fewer, or alternate components and/or functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of devices and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 4 illustrates a visual depiction at a user interface of an exemplary block of data expressed in a limited expression format.

Figure 1:
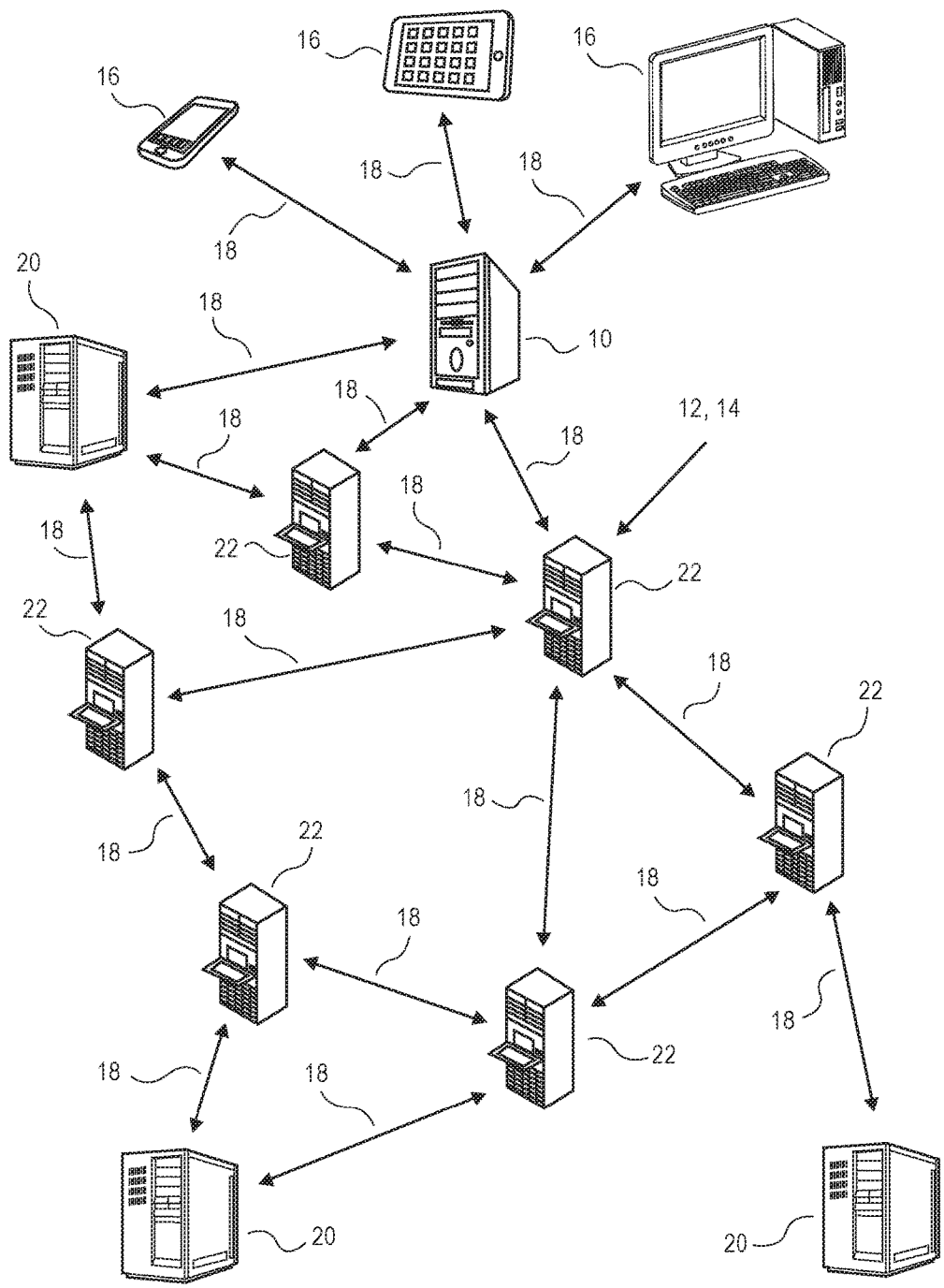
FIG. 1 illustrates a plurality of electronic devices and an exemplary computer network of interconnected data transmission devices and data storage devices with which various embodiments of a network computing device may interact.

The Figures depict exemplary embodiments for purposes of illustration only. One skilled in the art will readily recognize from the following discussion that alternative embodiments of the systems and methods illustrated herein may be employed without departing from the principles of the present inventive concept described herein.

DETAILED DESCRIPTION

The present embodiments relate to, inter alia, information security and protecting personal and sensitive information, such as social security numbers, driver's license numbers, tax identification information, account numbers, or other sensitive information. In one aspect, a data field shutter (or mask) may be deployed. The shutter's function is to mask the identified data fields to be protected fully or partially as a function of the presentation layer of a user interface. For example, sensitive data to be displayed on a display screen of a computing device may be masked or otherwise hidden from view.

If an authorized application user, such as an employee of an insurance or financial service provider, needs to access the sensitive information in a protected field, they will activate the shutter release associated with the protected field to expose the shuttered data in the field. The shutter release may be a button, icon, or a trigger actuated by a related user action on the screen, verbally, or by voice as examples.

The activation of the shutter not only presents the information to the user, but may also record the user, date, time, or any other identified information to a log. The shutter may also be configured to stay open for a specified period of time, such as 2-3 seconds, before closing once again.

Additional configurations for the shutter may tie the ability to limit the activation, or type of activation, based upon user or group access controls which may limit who may activate the shutter, and if the shutter is activated, whether the user sees the entire data field or a masked or truncated set of information in the field. The logging system may be configured to alert an administration or manager based upon (i) abnormal user activity; (ii) thresholds like exceeding thresholds for shutter activations by a single user in a configured timeframe; (iii) by access control; (iv) by shutter activations within a specified record; and/or (v) based upon time of day.

While the shutter may not prevent authorized users from accessing information they require to complete their job, it may provide a date and time stamped log of "Shuttered" or "Masked" information that was accessed by a specific user. The shutter may substantially reduce the impact of a breach situation by being intertwined with the operation of the log, which may allow management to determine the records that were accessed by an individual user of the system. Thus, the present solution may solve the problem of determining what information was accessed by a malicious user when no information in the record is changed.

As noted, the present embodiments may involve employing a technique that allows sensitive information to exist in a system while deterring users from surfing sensitive data. The technique may involve providing configurable access and using logging capabilities to detect when sensitive data is viewed in a much less expensive manner than current footprint capabilities may require.

The terms "shutter" and "mask" may be used interchangeably herein. The shutter and mask of the present embodiments may potentially reduce the impact of malicious users that abuse their access to customer sensitive information that they are authorized to use as part of their job function. In any office environment, the shutter functionality may be tied to certain employees depending upon their level of need to access sensitive information. The amount that each employee is accessing the sensitive information may be logged to determine improper access. For instance, the amount that the shutter on a user interface is opened may be automatically tracked and monitored for abnormal activity by one or more processors.

One context of the present embodiments is related to protecting confidential or sensitive information in a software application. Other examples may include systems that contain VIP information, surveys, quizzes/tests, research, puzzles, or games, as some examples. In one embodiment, the sensitive information may relate to bank accounts; trading accounts; vehicle, home, student, or other types of loan accounts; checking or saving accounts; retirement accounts; or other financial accounts.

Other sensitive information may include medical information or health conditions. In this scenario, some employees may need more access to the sensitive information than others. For example, a nurse may need much more access to medical information than an administrative assistant. The shutter may be operable by the nurse or other employee needing access to the sensitive information, while the shutter may be non-operable or disabled (i.e., always remains closed) for those employees not needing access to the sensitive information, such as a secretary. Alternatively, the nurse's user interface may be devoid of any shutters, allowing full access to medical information, while a secretary's user interface includes an operable shutter that opens and closes to allow only limited access to medical or other sensitive information.

Additionally or alternatively, the sensitive information may relate to insurance policies, such as policies associated with auto, home, life, renters, health, or other types of insurance. In one scenario, an insurance agent may need access to the customer's sensitive information. The insurance agent may have a computer display that does not include a shutter for sensitive information. On the other hand, if the insurance agent has an administrative assistant or other employee that may not need full access, or needs only partial access, to the customer sensitive information, their respective computing devices may display user interfaces having shutters for limiting access to sensitive information. The shutter functionality may also be used to facilitate tracking employee access and/or use of such sensitive information.

In one embodiment, the shutter may be dynamic. For instance, the shutter may open for a set period of time, e.g., a few seconds, and then automatically shut after the user has viewed the information. Additionally or alternatively, the shutter may be a user adjustable shutter, such as how far to open or close a shutter being determined by operating a button or icon if the user has the appropriate level of access or need for access.

In another embodiment, the shutter may be displayed on a customer's display screen or mobile device, as opposed to an employee's computing device. The shutter may be operated by the customer operating a View button or icon. As noted above, the sensitive information may relate to an insurance policy. In one embodiment, a processor may log when and if an insurance customer has viewed or reviewed their insurance policy or portions thereof.

For instance, the shutter may hide and reveal terms and conditions of an auto insurance policy. The insurance policy may be viewable by the customer electronically, such as via wireless communication with a computing device. Various portions of the insurance policy may be considered sensitive information, and normally hidden when the insurance policy is displayed. However, when the customer operates the View button, the sensitive information (including terms and conditions of the insurance policy) may become viewable by the customer, and the present embodiments may log that the customer has viewed the sensitive information (including the terms and conditions of the insurance policy).

In one embodiment, a virtual data shutter may be provided. The virtual data shutter may cover up sensitive or personal data, such as account numbers. For instance, the virtual data shutter may be superimposed upon, or placed on top of, other data (such as sensitive data) being shown or contained within a virtual screen or page. The underlying sensitive or personal still may be contained within a virtual screen or page, but hidden or unreadable to the human eye because it is being masked or covered up by the virtual data shutter, which may be a dark color, such as black. Thus, the sensitive or personal data may be preserved for subsequent usage or retrieval—as opposed to being stricken or redacted from a virtual screen or page.

I. Exemplary Embodiments

Broadly speaking, embodiments of the present inventive concept provide unexpected benefits that may significantly reduce organizational expenditures relating to IT security. For example, one embodiment may provide for automated tracking of specific network user activities that may be regarded as suspicious behavior(s) and for system-generated notifications to administrators relating to same. Such notifications and their triggers may be fine-tuned to organizational standards in view of the types of information made available to users and to specific users or types or levels of users.

Embodiments of the present inventive concept may also allow an organization to investigate a potential data breach with precision and efficiency. For example, another embodiment may permit an organization to look back over logged event records of the activity of one or more users occurring within a timeframe in which a suspected data breach occurred. If a particular user is identified as the perpetrator of a breach, the organization may confidently and quickly confirm exactly which customers' information may be part of the breach by determining which specific data fields that user requested to view. In this way, embodiments of the present inventive concept may have particularly beneficial application with users that commonly view organization data visually, making it difficult to track what information was actually viewed using conventional methods.

Still further, another embodiment of the present inventive concept may be configured to prospectively prevent widespread breaches, for example by shutting down a user's ability to issue, or by denying, a revelation request if he or she exceeds a certain pre-determined threshold above which such requests become suspicious.

Embodiments of the present inventive concept include computer-implemented methods, non-transitory computer-readable media, and network computing devices for controlling the expression of data from a sensitive storage device. Where it has been determined that a particular storage device contains sensitive data or is otherwise considered sensitive (see more detailed discussion below), a network computing device or an administrator may choose to institute one or more limited expression formats applicable to data field(s) originating with that sensitive storage device. The administrator may also define that such limited expression format(s) only apply to expressions made on certain destination device(s).

How certain data fields are identified as requiring masking (in whole or in part), the rules that govern when such masking occurs, and how and when it is removed or removable, and other aspects of certain embodiments are discussed in more detail below. Generally, however, a destination device may issue a transfer request identifying one or more blocks of data to be expressed at the destination device. In various embodiments, the request may travel to another application within the device that controls data storage media integral with the same device, to a sensitive storage device housed within the same structure as the destination device, or across a local, metro or wide area network to a more remote sensitive storage device. The data transfer request may also be processed by a processing element of the system or an intermediate network node, as discussed in more detail below.

In response to the data transfer request, a data mask indicator is determined at one or more devices of the system of the present inventive concept. The data mask indicator may be a property of the requested block of data, data contained in a file header of the block of data or the transfer request, or other information determined and/or consumed in the process of choosing an applicable limited expression format and its manner of application to one or more data fields of the block of data.

The limited expression format may be applied somewhere in a transmission chain between the sensitive storage device and the destination device, including at a presentation layer of a user interface. It may be applied in various ways, discussed in more detail below, for example with the goal of partially or fully obscuring one or more digits of a data field, at least initially. After or contemporaneously with application of the limited expression format, the requested block of data may be expressed at the destination device. In this manner, such an embodiment may help maintain data security simply for the fact of such data not being fully available to users during normal day-to-day business activities for which it is not necessarily needed. As a result, unneeded exposure to relatively unprotected environments may be avoided.

If a user determines he or she needs to access one or more portions of masked data, he or she may, in one aspect, be permitted to issue a revelation request for unmasking all or a portion of the data obscured by the limited expression format. In this way, each piece of sensitive data the organization wishes to "keep tabs on," if expressed outside a relatively protected environment to a requesting user, is only expressed according to a very deliberate and conspicuous action of the user.

Furthermore, the user action and the grant of the revelation request may be easily trackable and controllable, such as through recording event log information regarding the same and permitting a relatively unobtrusive mechanism by which to deny user access to certain information through mere denial of the request. Still further, components of an embodiment may be configured to streamline the process of issuing and granting revelation requests to minimize the chances of obstructing user productivity. For example, in some configurations, each revelation request may be configured to be automatically granted in the absence of administrator intervention—thereby simplifying certain aspects disclosed herein while highlighting passive tracking capabilities of the system that may be maintained even in lower security settings.

Specific embodiments of the technology will now be described in connection with the attached drawing figures. The embodiments are intended to describe aspects of the present inventive concept in sufficient detail to enable those skilled in the art to practice the present inventive concept. Other embodiments may be utilized and changes may be made without departing from the scope of the present inventive concept. The following detailed description is, therefore, not to be taken in a limiting sense. The scope of the present inventive concept is defined only by the appended claims, along with the full scope of equivalents to which such claims are entitled.

II. Exemplary Network Computing Device

Embodiments described in this patent application and other possible embodiments may relate to, inter alia, devices and methods for controlling the expression of a block of data from a sensitive data storage device. Certain embodiments may require transmission of the block of data over a computer network and/or via a network node. The network may be a computer network that includes the source sensitive data storage device and the destination device, as well as other data storage devices and a plurality of data transmission devices, each of which may be considered a network node. Each data storage device may typically be a data server, but may also be a desktop or workstation computer or the like. Each data transmission device may be a hub, a switch, a router, or the like, which generally may have a plurality of input ports and a plurality of output ports. Each of the input ports may be connected to one or more output ports.

A user may run an application or software program on an electronic device, such as a desktop computer, a tablet, a smartphone, or the like, which is used to request the transfer of a block of data from the source sensitive data storage device for expression at the destination device. The transfer may require moving data from one physical location to another or one system, software application or device to another. The transfer request may, in one embodiment, include information regarding the destination device's network routing or other address information customary to facilitate efficient data transmission to the device.

FIG. 1 depicts an exemplary environment in which embodiments of a network computing device 10 may be utilized. The environment may include a network 12 of interconnected nodes 14 and one or more electronic devices 16. The network computing device 10 may automatically configure and monitor the operation of the network 12 for transferring a block of data from a sensitive data storage device 14 to a destination device, such as electronic devices 16 or node devices 14. The transfer of the block of data may be requested by the electronic device 16, such as a desktop computer, a tablet, a smartphone, or the like. The electronic device 16 may be running or executing an application or software that requires data to be moved from one physical location to another or one system to another, to copy or backup data, to update records, or the like.

The network 12 may be embodied by a local, metro, or wide area network (LAN, MAN, or WAN) and may be formed using a plurality of known architectures and topologies. In some embodiments, a portion of the network 12 may be formed by at least a portion of the Internet, by communication lines that are leased from other entities, or by combinations thereof. The network 12 may be implemented within a small space such as an office or a building or across a larger space such as a city, a region, or a country. The network 12 may include the source sensitive data storage device and destination device, as well as a plurality of other nodes 14 and a plurality of interconnecting links 18. In addition, links 18 may exist between the network computing device 10 and the network 12, as well as the electronic devices 16 and the network computing device 10.

Each node 14 of the network 12 may be a data storage device 20 or a data transmission device 22. The data storage device 20 generally stores data and is typically embodied by a data server and may include storage area networks, application servers, database servers, file servers, gaming servers, mail servers, print servers, web servers, or the like, or combinations thereof. The data storage device 20 may be additionally or alternatively embodied by computers, such as desktop computers, workstation computers, or the like.

In addition, the data storage device 20 may be configured to transmit and receive data to and from other devices. The data storage device 20 may have various performance specifications, such as bandwidth available, jitter, latency, capacity or throughput, and the like. Furthermore, the data storage device 20 may have one or more currently running jobs, as well as a queue of planned jobs for the future.

The data transmission device 22 may generally forward or pass data, including data packets, through the network 12 and may be embodied by a hub, a switch, a network switch, a router, or the like. The data transmission device 22 may also temporarily store or buffer data before the data is forwarded. The data transmission device 22 may operate as an Open Systems Interconnection (OSI) layer-2 device, a layer-3 device, or combination of both. The data transmission device 22 may have a plurality of input ports and a plurality of output ports, wherein each of the input ports may be connected to one or more output ports.

The data transmission device 22 may further have the ability to set priorities or a quality of service (QoS) on the flow of data through the device. For example, data packets which include a particular flag, are from a particular source, or are bound for a particular destination may be forwarded in advance of other data packets, or may be forwarded at a higher frequency or datarate. Like the data storage device 20, the data transmission device 22 may have various performance specifications and job schedules similar to those discussed above.

The link 18, generally indicated in FIG. 1 as a double arrowhead line, between any two nodes 14, any node 14 and the network computing device 10, or any personal computing or electronic device 16 and the network computing device 10 may be formed using wires, such as electrically conductive cables or fiber optic cables, or wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

In various embodiments, each data transmission device 22 may be in communication with at least one other data transmission device 22 and, optionally, one or more data storage devices 20. Each data storage device 20 may be in communication with at least one data transmission device 22 and, optionally, one or more other data storage devices 20. Thus, the connection architecture of the network 12 allows any node 14 to communicate with any other node 14 either directly or indirectly. Furthermore, the connection architecture of the network 12 creates one or more paths between any two nodes 14, wherein each path includes the data storage devices 20 or data transmission devices 22 at the endpoints of the path plus the nodes 14 and links 18 that form a unique route between the endpoint nodes 14.

Figure 2:
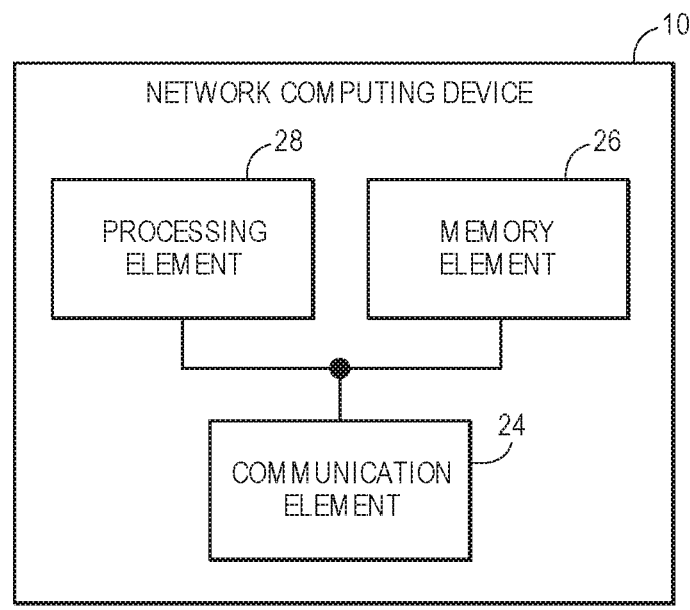
FIG. 2 illustrates various components of the exemplary network computing device shown in block schematic form.

The network computing device 10, as shown in FIGS. 1 and 2, generally manages the transfer of blocks of data between data storage devices 20 and electronic devices 16 and may include a communication element 24, a memory element 26, and a processing element 28.

The communication element 24 generally allows communication with external systems or devices. The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. In certain embodiments, the communication element 24 may also couple with optical fiber cables. The communication element 24 may be in communication with or electronically coupled to the memory element 26 and the processing element 28.

The memory element 26 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 26 may include, or may constitute, a "computer-readable medium". The memory element 26 may store the instructions, code, code segments, software, firmware, programs, applications, apps, services, daemons, or the like that are executed by the processing element 28. The memory element 26 may also store settings, data, documents, sound files, photographs, movies, images, databases, and the like.

The processing element 28 may include processors, microprocessors, microcontrollers, DSPs, field-programmable gate arrays (FPGAs), analog and/or digital application-specific integrated circuits (ASICs), or the like, or combinations thereof. The processing element 28 may generally execute, process, or run instructions, code, code segments, software, firmware, programs, applications, apps, processes, services, daemons, or the like. The processing element 28 may also include hardware components, such as finite-state machines, sequential and combinational logic, and other electronic circuits that may perform the functions necessary for the operation of embodiments of the current inventive concept. The processing element 28 may be in communication with the other electronic components through serial or parallel links that include address busses, data busses, control lines, and the like.

Through hardware, software, firmware, or various combinations thereof, the processing element 28 may be configured to perform the following operations. The processing element 28 may receive a request for a transfer of a block data from the application being executed by the electronic device 16, which in one embodiment is also the destination device at which the block of data is to be expressed. The request may identify a source sensitive data storage device 20 of the block of data, the destination device 16 for the block of data, a size of the block of data, and/or other information facilitating transfer of the block of data including information to aid in determination of a data mask indicator and/or application of a limited expression format.

The processing element 28 may choose to institute one or more limited expression formats applicable to data field(s) originating with the sensitive storage device 20 identified in the transfer request. The processing element 28 may selectively apply such limited expression format(s) to expressions made on certain destination device(s) 16.

Generally, a destination device 16 may issue a transfer request identifying one or more blocks of data to be expressed at the destination device 16. In one embodiment, the request may travel to another application within the device 16 that controls data storage media integral with the same device, to a sensitive storage device housed within the same structure as the destination device 16, or across a local, metro or wide area network to a more remote sensitive storage device such as a storage device 20. The data transfer request may also be processed by the processing element 28 of the system or an intermediate network node, as discussed in more detail below.

In response to the data transfer request, a data mask indicator may be determined by the processing element 28. The data mask indicator may be (1) a property of the requested block of data; (2) data contained in a file header of the block of data or the transfer request; and/or (3) other information determined and/or consumed in the process of choosing an applicable limited expression format and/or its manner of application to one or more data fields of the block of data.

The limited expression format may be applied, either by the processing element 28, the sensitive data storage device 20, or at a presentation layer of a user interface of the destination device 16. It may be applied in various ways, discussed in more detail below, preferably with the goal of partially or fully obscuring one or more digits of a data field, at least initially. After or contemporaneously with application of the limited expression format, the request block of data may be expressed at the destination device 16.

If a user determines he or she needs to access one or more portions of masked data, he or she may be permitted to issue a revelation request for unmasking all or a portion of the data obscured by the limited expression format. Further, the processing element 28 or a processing device of the destination device 16 may be configured to streamline the process of issuing and granting revelation requests to minimize the chances of obstructing user productivity. For example, in some embodiments the responsible processing element may be configured such that each revelation request may be automatically granted in the absence of administrator intervention, thereby simplifying certain aspects disclosed herein while highlighting passive tracking capabilities of the system that may be maintained even in lower security settings.

III. Exemplary Computer-Readable Media for Controlling the Expression of Data from a Sensitive Data Storage Device One aspect of the technology may provide computer-readable media for controlling the expression of data from a sensitive data storage device. The computer-readable media may include executable software code stored thereon, wherein the code instructs a processing element of a network computing device to perform the following steps: (1) receive from a software application a request to transfer a block of data from a source protected sensitive data storage device for expression at a destination device; (2) determine a mask indicator for the block of data; (3) apply or instruct the application of a limited expression format based upon the data mask indicator; (4) cause the expression of the block of data at the destination device in the limited expression format; (5) permit a user to request revelation of a masked portion of the block of data, (6) check a permission status of the user and/or reveal the masked portion of the block of data; (7) record in a memory log, for example in a memory element, data regarding the user's revelation request activities; (8) compare the data in the memory log to at least one pre-determined usage rule; and/or (9) perform at least one of the following based upon the comparison in step (8): (a) generate a report to an administrator, (b) generate an alert to an administrator, and/or (c) adjust user permissions including with respect to rights to issue or be granted revelation requests. The program stored on the computer-readable media may instruct the processing element to perform additional, fewer, or alternative actions, including those discussed elsewhere herein.

For instance, the program may instruct the processing element to determine the data mask indicator from: a property of the requested block of data, data contained in a file header of the block of data or the transfer request, or other information determined and/or consumed in the process of choosing an applicable limited expression format and its manner of application to one or more data fields of the block of data. The program may further instruct the processing element to apply the limited expression format at any component in the transmission chain between a sensitive storage device and a destination device, though such application more preferably occurs at a presentation layer of a user interface.

The program may further instruct the processing element to apply the limited expression format in a variety of ways, preferably with the goal of partially or fully obscuring one or more digits of a data field, at least initially. After or contemporaneously with application of the limited expression format, the processing element may be instructed to cause the transfer of the block of data so that it may be expressed at the destination device.

Still further, in certain embodiments the program may instruct the processing element to automatically grant revelation requests of the user to minimize the chances of obstructing user productivity.

IV. Exemplary Network Computing Device for Controlling the Expression of Data from a Sensitive Data Storage Device Another aspect of the technology may provide a network computing device for automatic configuring of a network of interconnected data storage devices and data transmission devices to handle electronic data traffic. The network computing device may include a communication element, a memory element, and/or a processing element. The communication element may receive and transmit communications to and from a plurality of data storage devices and a plurality of data transmission devices. The memory element may be electronically coupled to the communication element and may store executable instructions. The processing element may be electronically coupled to the communication element and the memory element. The processing element may be configured to receive from a software application a request to transfer a block of data from a source sensitive data storage device for expression at a destination device. The processing element may further be configured to determine a mask indicator for the block of data, apply or instruct the application of a limited expression format based upon the data mask indicator, and/or to cause the expression of the block of data at the destination device in the limited expression format.

The processing element may still further be configured to permit a user to request revelation of a masked portion of the block of data and to check a permission status of the user and reveal the masked portion of the block of data. The processing element may further be configured to record in a memory log, for example in a memory element, data regarding the user's revelation request activities, to compare the data in the memory log to at least one pre-determined usage rule, and/or to perform at least one of the following based upon such comparison: (a) generate a report to an administrator, (b) generate an alert to an administrator, and (c) adjust user permissions including with respect to rights to issue and/or be granted revelation requests.

The network computing device may include additional, fewer, or alternate components and/or functionality, including that discussed elsewhere herein. For instance, the processing element may be further configured to determine the data mask indicator from: a property of the requested block of data, data contained in a file header of the block of data or the transfer request, or other information determined and/or consumed in the process of choosing an applicable limited expression format and its manner of application to one or more data fields of the block of data. The processor may further be configured to apply the limited expression format at any component in the transmission chain between a sensitive storage device and a destination device, though such application more preferably occurs at a presentation layer of a user interface.

The processing element may yet further be configured to apply the limited expression format in a variety of ways, preferably with the goal of partially or fully obscuring one or more digits of a data field, at least initially. The processing element may also be configured to cause the transfer of the block of data after or contemporaneously with application of the limited expression format, so that it may be expressed at the destination device.

Still further, in certain embodiments the processing element may be configured to automatically grant revelation requests of the user to minimize the chances of obstructing user productivity.

V. Exemplary Computer-Implemented Method

Figure 3:
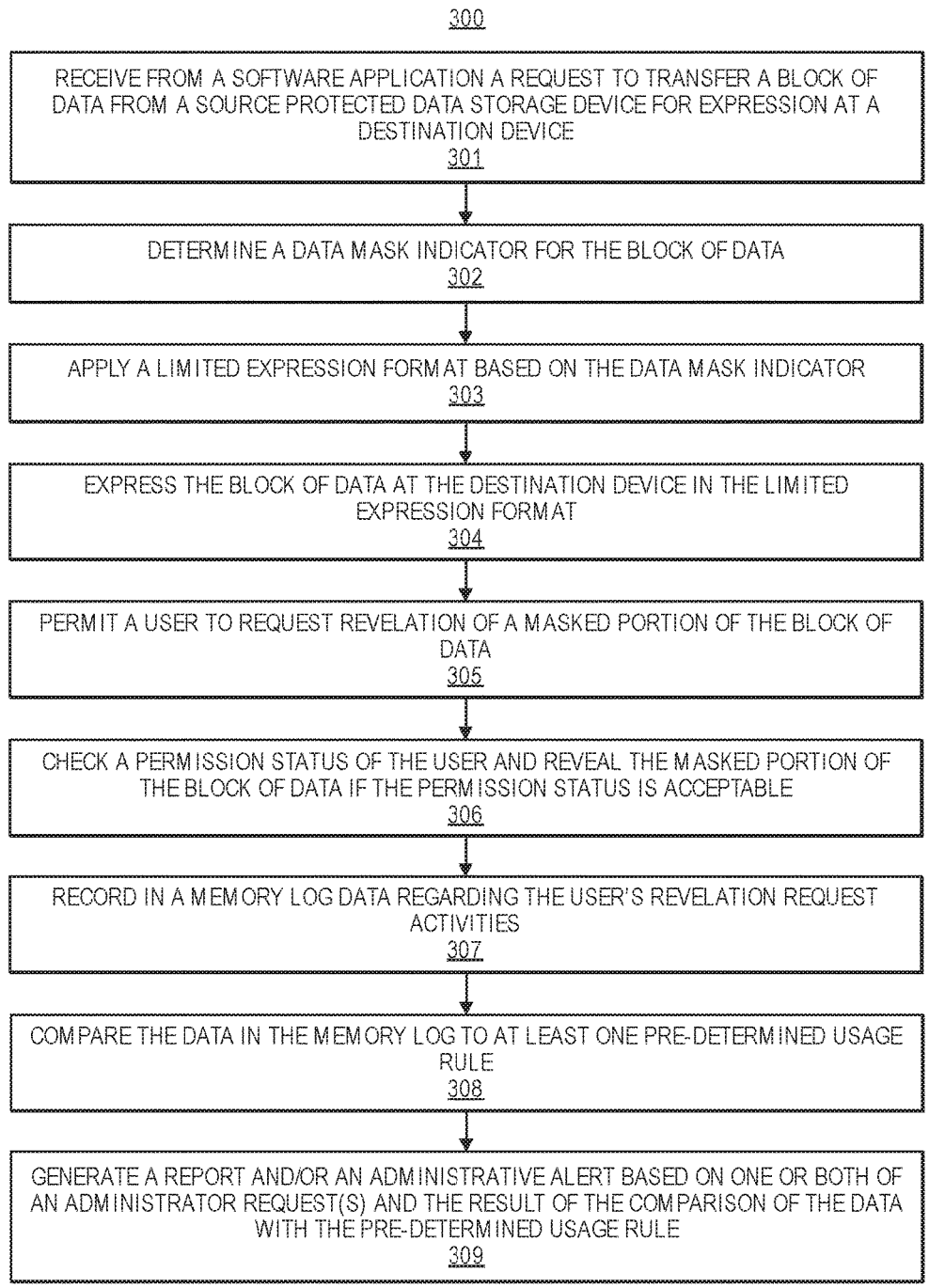
FIG. 3 illustrates at least a portion of an exemplary computer-implemented method for controlling the expression of a block of data from a sensitive data storage device.

FIG. 3 depicts an exemplary computer-implemented method 300 for controlling the expression of data from a sensitive data storage device. The method 300 may be performed in the order shown in FIG. 3, or the actions may be performed in a different order. Furthermore, some actions may be performed concurrently as opposed to sequentially. In addition, some actions may be optional. The actions of the computer-implemented method 300 may be performed by the network computing device 10.

As used throughout, a "sensitive" data storage device is one which a network computing device or an administrator employing the teachings herein has determined it or sensitive data should be the subject of data flow control and/or tracking. In certain embodiments, the sensitive data storage device is one that holds personal, confidential, medical and/or other types of data commonly regarded as in need of secure storage. The sensitive data storage device may comprise traditional storage media, such as those non-exhaustively described herein as the potential components of a memory element. The determination of which data storage device(s) are "sensitive" may be made at a device-level, for example by designating a device or group of devices. The determination may also be made based upon the type of data or information that is the subject of a data transfer request, making the storage device that will be transmitting the requested data a "sensitive" data storage device by virtue of its role in storing such data.

In one embodiment, the sensitive data storage device may be subject to one or more security protocol(s) or layers that restrict transfer of data to and from and/or access to the device. In yet a further embodiment, such security protocol(s) may be implemented at a network level, such as within a local area network (LAN), so that the data stored on the sensitive storage device may be protected by one or more layers of security protocol that form a protected network environment around a grouping of secured devices, for example a subset of devices in network 12 of FIG. 1. Such security protocol(s), whether at a device or network level, may include firewalls, password security, encryption, antivirus software, agent-based device monitoring software, network monitoring software, and other conventional security protocol(s) known to those having skill in the art. Security protocol(s) other than those set forth hereinabove may be employed with certain embodiments without departing from the spirit of the present inventive concept.

Referring to step 301, a data transfer request may be transmitted from the destination device to another device connectable to a network, for example to network computing device 10. In certain embodiments, the destination device may be integral with the sensitive data storage device, and in such embodiments, the data transfer request may simply pass from one application or driver to another for processing (and the steps outlined herein may be performed in whole or in part within the integral device). The data transfer request may include traditional file header information and additional information, for example information relating to the source of the block of data, category or type of information requested, specific a memory location (s), destination for the block of data, and/or size of the block of data to be transferred.

The data transfer request may be in a structured data format complementary or identical to the data structures employed by the sensitive data storage device(s) that are the subject of the request. The transfer request may also undergo processing by processing element(s) outside or integral with the sensitive data storage device so that the requested block of data within the sensitive data storage device may be properly identified and retrieved based upon the data transfer request. Conventional methods and components for interpreting and translating data transfer requests, for example conventional network controllers and filters, applications software, systems software and driver stacks, may be employed by various embodiments to identify the requested data within and across various data structure formats without departing from the spirit of the present inventive concept.

The destination device may be any device or component, for example a network node, that is connectable to the network at which it is requested the block of data be provided to a user. Destination devices may comprise desktop computers, or mobile devices (such as tablets, smartphones, phatblets, netbooks, notebooks, pagers, PDAs (personal digital assistants), smart glasses, smart watches or bracelets, wearable electronics, or other computing devices configured for wireless communication). However, it is envisioned that a wide variety of devices configured to express blocks of data may be used without departing from the spirit of the present inventive concept.

Referring to step 304, the block of data may be made available or expressed at the destination device in a limited expression format in accordance with embodiments of the present disclosure. For example, the block of data may be expressed at a visual display (peripheral) device of a personal computing device (See FIG. 4) by being displayed thereon in a limited expression format, or may be expressed at a personal computing device's universal serial bus (USB) electrically connected to a user storage device by being made available for transfer there, depending on the destination and mode of expression requested or employed by the user. It is envisioned that a variety of data expression mediums may be employed in accordance with various embodiments without departing from the spirit of the present inventive concept. Furthermore, the block of data may be transmitted to the destination device using conventional wireless or wired, network or direct device-to-device data transmission infrastructure, including by transmission via one or more intermediate network nodes that may be within or outside a protected network environment.

Referring to step 303, the block of data may be expressed in a limited expression format where one or more portions of the block of data are subject to muted expression or are not expressed at the destination device. For example, in a limited expression format, one or more digits of a data field may be obscured from view at a destination device comprising a visual display device (See FIG. 4), or garbled or muted in an auditory recitation of the data field contents by a speaker device. For another example, one or more digits of a data field may be omitted from expression to a user storage device connected to the USB port of a destination device, or replaced with a standard character representing an omitted element of the data field. Yet another example might be the full or partial obscuring of an image file for expression in a limited expression format. It is envisioned that limited expression formats may include a variety of means for muting or omitting the expression of elements of a block of data without departing from the spirit of the present inventive concept.

The limited expression format may be applied by any of a number of devices, for example by any of various nodes within the computer network. The device that applies the limited expression format to the block of data may do so by altering the contents of the block of data (e.g., by removing, replacing or encrypting elements of certain data field(s)), by facilitating only partial transmission of the contents of the block of data from the sensitive data storage device, by adding or altering metadata associated with the block of data, by creating and/or transmitting a computer instruction relating to how the block of data should be processed, etc. The device applying the limited expression format may be the sensitive storage device, a processing element electrically connected to the sensitive storage device, a network node, a router, or the destination device itself. In one embodiment, the limited expression format may be applied at a presentation layer of a user interface. However, it is envisioned that the limited expression format may be applied by a variety of devices without departing from the spirit of the present inventive concept.

The block of data may also be encrypted. One method of applying a limited expression format may be to encrypt certain elements of a block of data comprising or consisting of a data field, with the encrypted elements representing or being co-extensive with the elements that are to be muted or omitted from expression (i.e., "masked") at the destination device. For another example, the entire block of data may be encrypted in certain embodiments, and the destination device may only unencrypt those portions of the block of data that are to be expressed in an unmasked manner according to the applicable limited expression format. The block of data may also be encrypted to ensure security of the block of data following transmission from the sensitive data storage device and/or as a means for verifying the identity of a recipient.

Referring to step 302, the limited expression format may be applied based upon a data mask indicator, which may include one or more of: (a) information indicating portions of the block of data to be muted or omitted from expression (i.e., "masked"), and (b) information indicating the limited expression format to be employed. The data mask indicator may be determined from information provided by the data transfer request and/or properties of or information relating to the requested block of data. The device applying the limited expression format preferably determines and/or consumes the data mask indicator to determine whether and how to apply the limited expression format.

In one embodiment, the device applying the limited expression format may simply be programmed to apply the limited expression format to all data and information requested and/or transmitted via the device. In such a case, the data mask indicator may not be necessary, or may simply be information in the data transfer request that indicates such device is to assist in facilitating transmission of the block of data in response to the transfer request. In other embodiments, the data mask indicator may be explicitly provided in the data transfer request, for example when the destination device provides an instruction that the block of data should be transferred for expression in a specified limited expression format.

In still other embodiments, the data mask indicator may be determined by examining information about one or more properties of the contents of the block of data which are evident from examination of one or both of the data transfer request and the block of data itself. In these embodiments, the device applying the limited expression format may review information about the requested block of data—such as file type, metadata and file headers for the requested information, specific contents of the block of data, etc.—to determine what parts of the block of data should be muted or omitted from expression at the destination device.

In other embodiments, the device applying the limited expression format may be configured to choose between different formats in response to the determination of the data mask indicator. For example, if an exemplary block of data consists of data from two separate sensitive data storage devices, the data mask indicator may comprise Internet protocol (IP) or machine access control (MAC) address information regarding those two sensitive data storage devices and be provided by the data transfer request. The device may, in such cases, apply a first limited expression format to data from the first sensitive data storage device, and a second limited expression format to data from the second sensitive data storage device. For another example, the data mask indicator may comprise information regarding type(s) of file contents comprising the block of data, and the applying device may choose between various limited expression formats that are considered appropriate for corresponding specified data type(s). It is envisioned that devices responsible for applying one or more limited expression formats according to various embodiments will be configured to appropriately determine when and which such limited expression format(s) should be applied based upon one or more data mask indicators without departing from the spirit of the present inventive concept.

The data mask indicator and/or its operative association with one or more limited expression formats may be defined by an administrator, for example in view of a conventional permission-based access schema. A data transfer request by a user or destination device in such an embodiment may be classified within a particular permission level that may inform or comprise determination of the data mask indicator and, in turn, lead to determination of the choice and/or operation of the limited expression format. In one embodiment, a very important user's higher permission level (e.g., as evidenced by a password or more complicated identity-defined access level identifier) will inform determination of the data mask indicator, leading to the benefit of a limited expression format or format implementation that masks less of the requested block of data.

The data mask indicator may be determined, in whole or in part, by a variety of devices, and in some embodiments may be determined by a device other than the device that applies the limited expression format. For example, the destination device may be configured to apply the limited expression format and the sensitive storage device may be configured to make all or part of the determination of the data mask indicator. In another embodiment, a processing element connectable to the destination device may determine the data mask indicator in connection with generation of the data transfer request, and the sensitive storage device may apply the limited expression format prior to transmitting the block of data to the destination device. It is envisioned that various devices may contribute to or solely make the determination of the data mask indicator without departing from the spirit of the present inventive concept.

Referring to step 305, embodiments of the present inventive concept may further permit generation of a request to reveal one or more portions of the block of data that is, or would be, masked by a limited expression format. The revelation request may be provided before or after the block of data is expressed in a limited expression format at the destination device. In one embodiment, the revelation request may be generated after expression of all or part of the block of data at the destination device. A user in certain embodiments may generate a revelation request by an interaction with a user interface of a destination device, for example by clicking on a masked portion of a data field, verbally requesting one or more masks to be removed, and/or by a keyboard stroke indicating the portion of the block of data that is the subject of the request. It is envisioned that a variety of inputs, user interactions and/or software triggers may be utilized to generate a revelation request without departing from the spirit of the present inventive concept.

The revelation request may target one or more specifically-identified masked portions of the block of data. For example, if the block of data comprises a set of customer profiles, each of which includes personal or confidential information regarding a customer, a revelation request may specifically request unmasking of one or more digits of a particular field within a single customer profile record. Alternatively, the revelation request may relate to unmasking all fields of a certain type within a block of data or some other subset or grouping of fields within the block of data. In certain embodiments, a revelation request may relate to all fields of a block of data that were or would be masked by a limited expression format. It is envisioned that the revelation request may target various specific fields or groupings of fields, or even specific individual data elements, such as single digits of data fields, without departing from the spirit of the present inventive concept.

An example of a customer profile according to the example discussed immediately above is shown in FIG. 4. FIG. 4 shows the visual expression at a display destination device, such as a mobile device, of a portion of a block of data after application of a limited expression format. More specifically, the limited expression format has been applied to the block of data that contains the depicted profile such that the customer's social security number ("SSN") is fully masked in one data field by a shutter feature of this embodiment. The customer's driver's license number in another data field is only partially masked by a shutter of this embodiment. In this embodiment, the degree of masking (using a "shutter" feature in this example) directly correlates with an assessment, for example made by a network computing device or an administrator, of the sensitivity of each displayed data field.

As depicted by FIG. 4, clicking on the "View" button or icon may cause operation of a shutter or partial shutter (or mask). Clicking or pressing the View button, for example, may cause sensitive information to be revealed or even partially revealed, such as via a partial shutter or partial mask, on a display of a mobile device. Clicking upon the View button (or other icon) a second time, may cause the sensitive information to be masked, or partially masked (such as via a full or partial shutter, respectively) once again. Additionally or alternatively, clicking on the View button may initiate entry to a log capturing information, such as user ID, time, date, role, etc.

In one embodiment, the network computing device or administrator overseeing processing of a revelation request may be configured to permit or deny the requested unmasking in whole or in part. Referring to step 306, the criteria on which such a request is permitted or denied may be a permission-based access schema similar to the ones discussed hereinabove. For example, in one embodiment a high-level access permission individual may be permitted more, more frequent, and/or broader access to masked data than a lower-level access permission individual. In another embodiment, the criteria may be based upon prior user activity, such as exceeding a threshold for a specified activity (such as number of revelation requests per unit time) logged according to the discussion below. It is envisioned that various criteria may be relied upon to permit or deny a revelation request without departing from the spirit of the present inventive concept.

The network computing device or an administrator may reinstitute all or part of a mask that was temporarily revealed pursuant to a revelation request. A reinstituted mask according to various embodiments may be triggered by passage of time since the revelation request was granted, by timing out of an access permission, and/or by other user activity, such as generating another revelation request for a different data field (indicating that the need to utilize the originally unmasked data has passed). It is envisioned that other triggers may be employed for replacement of masking that was temporarily removed pursuant to a revelation request, such as based upon other user activities logged by the system according to the description below, without departing from the spirit of the present inventive concept.

Referring to steps 307-309, one advantage of one embodiment of the present inventive concept is specific and accurate tracking of user access to data fields. Such technology may have the unexpected benefit of permitting an administrator to run a report detailing what specific digits of which specific data fields within a block of data have been the subject of one or more revelation requests. An administrator may further or alternatively set specific condition(s) that, if met, trigger an automatic notification or alert. For example, the administrator may wish to be notified if a pre-determined usage rule is violated, for example if: (a) specific data field(s) are unmasked more than a specified number of times per day, with or without reference to the user(s) that generated the underlying revelation request(s), (b) a specific user attempts to access more than a specified number of data field(s) within a given timeframe, for example more than twenty social security number data fields per hour, (c) a specific user issues a revelation request in excess of a given permission-access level, (d) a revelation request is issued outside of a specified date or time range, and/or (e) a revelation request is generated within or outside a specified geographic location, address range, or similar authorized or unauthorized grouping of devices. It is envisioned that a variety of pre-determined usage rules and triggers may be relied on to generate alerts, notifications, and/or system reports without departing from the spirit of the present inventive concept.

The foregoing embodiments and others according to the present inventive concept allow the system to be configured to provide automated "red flags" and specific snapshots of information accessed by permitted users of the system, including with reference to specific timeframes. Embodiments of the present inventive concept therefore help businesses identify suspicious behaviors of authorized (and unauthorized) users more readily than under conventional methods. Embodiments of the present inventive concept also help businesses investigate narrowly which sensitive data field record(s) may have been the subject of a data breach, which may reduce costs in complying with statutory and regulatory notification provisions under modern law.

Referring more specifically to step 307, in one embodiment, several details are recorded in a system or event log for each revelation request including: (a) date and time of revelation request, (b) date and time of location where the request was issued, (c) data type(s) for content subject to the request, (d) information sufficient to permit identification of the data that is the subject of the request, and/or (e) information sufficient to permit identification of the user issuing the request. It is envisioned that additional information may be logged in the system relating to revelation requests without departing from the spirit of the present inventive concept.

VI. Exemplary Method

In one aspect, a computer-implemented method for controlling expression of data from a sensitive data storage device may be provided. The computer-implemented method may include (1) receiving, via one or more processors, from a software application a request to transfer a block of data from a source sensitive data storage device for expression at a destination device; (2) determining, via the one or more processors, a data mask indicator for the block of data; (3) applying, via the one or more processors, a limited expression format based upon the data mask indicator; and/or expressing the block of data at the destination device or otherwise causing the block of data to be presented at the destination device, via the one or more processors (such as under their direction or control), in the limited expression format to facilitate protecting sensitive data. The method may include additional, less, or alternate actions, including those discussed elsewhere herein.

For instance, the sensitive data storage device may be a mass storage device of a personal computing device and the destination device may be a visual display of the personal computing device, such as a mobile device. The method may also include maintaining a security protocol around a plurality of secured devices comprising a protected network environment, wherein the plurality of secured devices may include the sensitive storage device.

The sensitive data storage device may be a mass storage device of a server. The method may also include transmitting the block of data to the destination device via a network node. The network node may be outside the protected network environment. The method may also include encrypting at least a portion of the block of data before it is expressed at the destination device.

The sensitive data storage device may be a mass storage device of a server and the destination device may be a network node. The method may also include transferring at least a portion of the block of data in limited expression format from the destination device to a user storage device. The storage device may be a mass storage device of a personal computing device. The destination device may be a personal computing device selected from the group consisting of (a) a desktop computer, (b) a tablet, and (c) a smartphone.

The method may include determining a mask indicator that includes at least one of (a) determining a property of the block of data, (b) examining metadata associated with the block of data, and (c) processing an instruction relating to the block of data. Determining a mask indicator may be performed at the sensitive data storage device, or at the destination device. Additionally or alternatively, determining a mask indicator may be performed at the network node and/or may include at least one of (a) determining a property of the block of data, (b) examining metadata associated with the block of data, and (c) processing an instruction relating to the block of data. The limited expression format may be applied to the block of data at the sensitive data storage device, or at the destination device.

The method may include decrypting at least a portion of the block of data at the destination device. The decrypted portion of the block of data may be co-extensive with an unmasked portion of the block of data. The request for the block of data may include information indicative of the identity of the destination device.

The method may include permitting a user to request revelation of a masked portion of the block of data. The method may include revealing the masked portion of the block of data in response to the user's request for revelation. The method may also include checking a permission status of the user and/or revealing the masked portion of the block of data in response to the user's request for revelation if the permission status of the user is acceptable.

The method may include recording in a memory log at least one of the following relating to the user revelation request: (a) time and date of the request, (b) location where the request was issued, (c) type of data subject to the request, (d) information sufficient to permit identification of the data that is the subject of the request, and/or (e) information sufficient to permit identification of the user issuing the request. The request for revelation of the masked portion of the block of data may be initiated by an input by the user conveyed by at least one of the following actions: (a) verbal command, (b) mouse click, and (c) keyboard stroke.

The method may include replacing the mask over the revealed portion of the block of data following passage of a pre-determined period of time. The method may include recording in a memory log information regarding user activity and/or generating an administrative system alert if the recorded user activity satisfies a pre-determined usage rule.

The pre-determined usage rule may relate to at least one of: (a) user revelation requests per unit time, (b) user revelation requests exceeding a permission status, (c) user revelation requests within a particular data category, (d) date and time of user revelation request, and (e) location of origin for user revelation request.

VII. Exemplary Non-Transitory Computer-Readable Medium

In one aspect, non-transitory computer-readable media with executable software code stored thereon for controlling expression of data from a sensitive data storage device may be provided. The code may instruct a processing element to (1) receive from a software application a request to transfer a block of data from a source sensitive data storage device for expression at a destination device; (2) determine a data mask indicator for the block of data; (3) apply a limited expression format based upon the data mask indicator; and/or (4) express the block of data at the destination device in the limited expression format. The code may include additional, less, or alternate functionality, including that discussed elsewhere herein.

For instance, the sensitive data storage device may be a mass storage device of a personal computing device and the destination device may be a visual display of the personal computing device. The code may further instruct the processing element to maintain a security protocol around a plurality of secured devices comprising a protected network environment, wherein the plurality of secured devices includes the sensitive data storage device.

The sensitive data storage device may be a mass storage device of a server, and the code may further instruct the processing element to transmit the block of data to the destination device via a network node. The network node may be outside the protected network environment.

The code may further instruct the processing element to encrypt at least a portion of the block of data before it is expressed at the destination device. The sensitive data storage device may be a mass storage device of a server and the destination device may be a network node. The destination device may be a personal computing device selected from the group consisting of (a) a desktop computer, (b) a tablet, and (c) a smartphone or other mobile device.

Determining a mask indicator may include at least one of (a) determining a property of the block of data, (b) examining metadata associated with the block of data, and (c) processing an instruction relating to the block of data. Determining a mask indicator may be performed at the sensitive data storage device, or at the destination device. Additionally or alternatively, determining a mask indicator may be performed at the network node and may include code further instructing the processing element to perform at least one of: (a) determining a property of the block of data, (b) examining metadata associated with the block of data, and (c) processing an instruction relating to the block of data.

The limited expression format may be applied to the block of data at the sensitive data storage device, or at the destination device. The code may further instruct the processing element to decrypt at least a portion of the block of data at the destination device. The decrypted portion of the block of data may be co-extensive with an unmasked portion of the block of data.

The request for the block of data may include information indicative of the identity of the destination device. The code may further instruct the processing element to permit a user to request revelation of a masked portion of the block of data.

The code may instruct the processing element to remove the masked portion of the block of data in response to the user's revelation request. The code may also instruct the processing element to check a permission status of the user and/or reveal the masked portion of the block of data in response to the user's revelation request if the permission status of the user is acceptable.

The code may instruct the processing element to record in a memory log at least one of the following relating to the user revelation request: (a) time and date of the request, (b) location where the request was issued, (c) type of data subject to the request, (d) information sufficient to permit identification of the data that is the subject of the request, and (e) information sufficient to permit identification of the user issuing the request.

The request for revelation of the masked portion of the block of data may be initiated by an input by the user triggered by at least one of the following actions: (a) verbal command, (b) mouse click, and (c) keyboard stroke. The code may instruct the processing element to replace the mask over the revealed portion of the block of data following passage of a pre-determined period of time.

The code may instruct the processing element to record in a memory log information regarding user activity and/or generate an administrative system alert if the recorded user activity satisfies a pre-determined usage rule. The pre-determined usage rule may relate to at least one of: (a) user revelation requests per unit time, (b) user revelation requests exceeding a permission status, (c) user revelation requests within a particular data category. (d) date and time of user revelation request, and (e) location of origin for user revelation request.

VIII. Exemplary Computer-Implemented Methods

In one aspect, a computer-implemented method of protecting, or limiting access to, sensitive information may be provided. The method may include (1) determining, via one or more processors, that a computing device (from among a plurality of computing devices, such as computing devices within an office) is flagged for only limited access to sensitive information (such as by using identification numbers or IP addresses); (2) determining or detecting, via the one or more processors, that the computing device flagged for only limited access to sensitive information is attempting to retrieve and/or display sensitive information; (3) in response or otherwise, generating, via the one or more processors, a virtual shutter for masking the sensitive information within a user interface (or webpage) to be displayed on the computing device flagged for only limited access to sensitive information; and/or (4) causing or directing, via the one or more processors, the virtual shutter to be displayed on the user interface when the user interface is first displayed on a display of the computing device flagged for only limited access to sensitive information. As a result, access to the sensitive information may be limited using the computing device and/or sensitive information may be masked within the user interface. The method may include additional, less, or alternate actions, including those discussed elsewhere herein.

For instance, the virtual shutter may be a dynamic shutter that is user-controllable. When the user opens the virtual shutter to display the sensitive information on the user interface (such as by operating a View button), the shutter remains open for only a limited period of time before automatically closing to hide the sensitive information once again.

User operation of the virtual shutter may be logged or tracked by the one or more processors to facilitate the one or more processors identifying improper accessing of the sensitive information by the user, such as by determining that the shutter has been operated or opened by the user over a predetermined number of times or several shutters have been operated within a given amount of time. The sensitive information may relate to insurance policies, financial accounts, medical, or other information associated with a customer.

A specific individual may be assigned or associated with each of the plurality of computing devices. Each specific individual may be assigned a security or access level based upon a need for accessing sensitive information that is required for their job role (such as assigning insurance agents and administration assistants different levels of access for insurance customer information, or assigning nurses and administration assistants different levels of access for medical information of customers/patients).

In another aspect, a computer-implemented method of protecting or limiting viewing of sensitive information may be provided. The method may include (1) determining, via one or more processors, that certain customer information is sensitive customer information (or otherwise flagging certain customer information as sensitive customer information); (2) determining or detecting, via the one or more processors, that a computing device is attempting to retrieve and/or display the sensitive information; (3) in response or otherwise, generating, via the one or more processors, a virtual shutter for masking the sensitive information within a user interface (or webpage) to be displayed on the computing device; and/or (4) causing or directing, via the one or more processors, the virtual shutter to be displayed on the user interface when the user interface is initially displayed on a display of the computing device such that the sensitive information is masked within the user interface or otherwise hidden from view within the user interface when the user interface first appears. The virtual shutter may be operable by user operation (such as by clicking upon a View button) to reveal all, or a portion of, the sensitive information (such as determined by a sensitive information access level associated with the user or the user's job) such that access to the sensitive information is limited using the computing device and/or normally masked within the user interface. The method may include additional, less, or alternate actions, including those discussed elsewhere herein.

For instance, when the user opens the virtual shutter to display the sensitive information on the user interface (such as by operating a View button), the shutter remains open for only a limited period of time before automatically closing to hide the sensitive information once again. User operation of the virtual shutter may be logged or tracked by the one or more processors to facilitate the one or more processors identifying improper accessing of the sensitive information by the user, such as by determining that the shutter has been operated or opened by the user over a predetermined number of times.

The sensitive information may be associated with insurance customers, financial services customers, or medical patients. A specific individual may be assigned or associated with an individual computing device, and each specific individual may be assigned a security or access level based upon a need for accessing sensitive information that is required for their respective job role.

In another aspect, a computer-implemented method of limiting viewing of sensitive information on a user interface may be provided. The method may include (1) generating, via one or more processors, a user interface or webpage for displaying customer information; (2) determining or detecting, via the one or more processors, that sensitive customer information is associated with, or going to be displayed on, the user interface or webpage; (3) detecting or determining, via the one or more processors, that a computing device is attempting to access the user interface or webpage (and/or sensitive customer information); (4) in response, generating, via the one or more processors, a virtual dynamic shutter for hiding all or a portion of the sensitive customer information; (5) causing or directing, via the one or more processors, the user interface or webpage to be displayed on a display associated with the computing device with the sensitive customer information being hidden or partially hidden by the virtual dynamic shutter; and/or (6) subsequently causing, via the one or more processors, the virtual dynamic shutter to reveal all, or a portion of, the sensitive customer information upon detecting or receiving a user operation on a View button to facilitate limiting access to, or viewing of, the sensitive customer information and/or otherwise protecting the sensitive customer information. The method may include additional, less, or alternate actions, including those discussed elsewhere herein.

For instance, when the user opens the virtual dynamic shutter to display the sensitive information on the user interface (such as by operating a View button), the virtual dynamic shutter remains open for only a limited period of time before automatically closing to hide the sensitive information once again. User operation of the virtual dynamic shutter may be logged or otherwise tracked by the one or more processors to facilitate the one or more processors identifying improper accessing of the sensitive information by the user, such as by determining that the shutter has been operated or opened by the user over a predetermined number of times and/or an inordinate number of virtual shutters have been operated by the user within a given period of time.

The sensitive customer information may be associated with insurance policies or customers, financial or utility accounts of customers, or medical information associated with patients. A specific individual may be assigned or associated with an individual computing device, and each specific individual may be assigned a security or access level based upon a need for accessing sensitive information that is required for their respective job role.

IX. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity or group of tangible entities, be that entities that are physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time. Moreover, the "processing element" may, unless more narrowly described, consist of multiple separate tangible pieces of hardware for operating in the described manner to perform certain operations described herein.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although embodiments of the present inventive concept have been described with reference to the illustrations in the attached drawing figures, it is noted that equivalents may be employed and substitutions made herein without departing from the scope of the present inventive concept as recited in the claims.

I claim:

1. A computer-implemented method for controlling expression of data from a sensitive data storage device, the computer-implemented method comprising:
   receiving from a software application, at or via one or more processors, a revelation request initiated by a user, the revelation request relating to masked one or more portions of information of a data field;

revealing, in response to the revelation request, the masked one or more portions of the information of the data field at a destination device;

automatically logging, via the one or more processors, identification information of the user, a time and date of processing of the revelation request, and at least one of (a) a data type for the masked one or more portions of the information of the data field, (b) a data type for the data field, and (c) information to permit identification of the information of the data field to generate log data;

automatically reinstituting, via the one or more processors, masking of the revealed one or more portions of the information of the data field after a predetermined period of time; and denying a revelation request from the user upon determining, based upon the log data, that a number of revelation requests from the user exceeds a predetermined threshold.

2. The computer-implemented method of claim 1, wherein the sensitive data storage device is a mass storage device of a personal computing device and the destination device is a visual display of the personal computing device.

3. The computer-implemented method of claim 1, the method further comprising maintaining, via the one or more processors, a security protocol around a plurality of secured devices comprising a protected network environment, wherein the plurality of secured devices includes the sensitive data storage device.

4. The computer-implemented method of claim 3, wherein the sensitive data storage device is a mass storage device of a server, the method further comprising a step of transmitting the information of the data field to the destination device via a network node.

5. The computer-implemented method of claim 4, wherein the network node is outside the protected network environment.

6. The computer-implemented method of claim 1, the method comprising:

determining, via the one or more processors, a data mask indicator corresponding to the information of the data field, wherein the determining of the data mask indicator includes at least one of (a) determining a property of the information of the data field, (b) examining metadata associated with the data field, and (c) processing an instruction relating to the data field.

7. The computer-implemented method of claim 6, wherein the determining of the data mask indicator is performed at the sensitive data storage device.

8. The computer-implemented method of claim 1, the method comprising applying, via the one or more processors, a limited expression format to the information of the data field based upon a data mask indicator, wherein the limited expression format is applied to the information of the data field at the destination device.

9. A computer-implemented method for controlling expression of data from a sensitive data storage device, the computer-implemented method comprising:

receiving from a software application, at or via one or more processors, a revelation request initiated by a user, the revelation request relating to masked one or more portions of information of a data field;

revealing, in response to the revelation request, the masked one or more portions of the information of the data field at a destination device;

automatically storing in a memory log, via the one or more processors, identification information of the user, a time and date of processing of the revelation request, and at least one of (a) a data type for the masked one or more portions of the information of the data field, (b) a data type for the data field, and (c) information to permit identification of the information of the data field to generate log data;

generating, via the one or more processors, a notification based upon at least a result of a comparison of the log data with a predetermined usage rule; and denying a revelation request from the user upon determining, based upon the log data, that a number of revelation requests from the user exceeds a predetermined threshold.

10. The computer-implemented method of claim 9, wherein the sensitive data storage device is a mass storage device of a personal computing device and the destination device is a visual display of the personal computing device.

11. The computer-implemented method of claim 9, the method further comprising maintaining, via the one or more processors, a security protocol around a plurality of secured devices comprising a protected network environment, wherein the plurality of secured devices includes the sensitive data storage device.

12. The computer-implemented method of claim 11, wherein the sensitive data storage device is a mass storage device of a server, the method further comprising a step of transmitting the information of the data field to the destination device via a network node.

13. The computer-implemented method of claim 12, wherein the network node is outside the protected network environment.

14. The computer-implemented method of claim 9, the method further comprising applying, via the one or more processors, a limited expression format to the information of the data field based upon a data mask indicator, wherein the limited expression format is applied to the information of the data field at the destination device.

15. A computer-implemented method for controlling expression of data from a sensitive data storage device, the computer-implemented method comprising:

receiving from a software application, at or via one or more processors, a revelation request initiated by a user, the revelation request relating to masked one or more portions of information of a data field;

revealing, in response to the revelation request, the masked one or more portions of the information of the data field at a destination device;

automatically storing in a memory log, via the one or more processors, identification information of the user, a time and date of processing of the revelation request, and at least one of (a) a data type for the masked one or more portions of the information of the data field, (b) a data type for the data field, and (c) information to permit identification of the information of the data field to generate log data;

adjusting, via the one or more processors, user permissions associated with rights to issue or be granted one or more revelation requests based upon at least a result of a comparison of the log data with a predetermined usage rule; and denying a revelation request from the user upon determining, based upon the log data, that a number of revelation requests from the user exceeds a predetermined threshold.

16. The computer-implemented method of claim 15, wherein the sensitive data storage device is a mass storage device of a personal computing device, and the destination device is a visual display of the personal computing device.

17. The computer-implemented method of claim 15, the method further comprising maintaining, via the one or more processors, a security protocol around a plurality of secured devices comprising a protected network environment, wherein the plurality of secured devices includes the sensitive data storage device.

18. The computer-implemented method of claim 17, wherein the sensitive data storage device is a mass storage device of a server, the method further comprising transmitting the information of the data field to the destination device via a network node.

19. The computer-implemented method of claim 18, wherein the network node is outside the protected network environment.

20. The computer-implemented method of claim 15, the method comprising applying, via the one or more processors, a limited expression format to the information of the data field based upon a data mask indicator, wherein the limited expression format is applied to the information of the data field at the destination device.

* * * * *